US006618243B1

(12) United States Patent
Tirosh (10) Patent No.: US 6,618,243 B1
(45) Date of Patent: Sep. 9, 2003

(54) COMPUTER PERIPHERAL SYSTEM FOR INTERCONNECTION WITH POCKETABLE PERSONAL ARTICLES

(75) Inventor: Amir Tirosh, Ra'anana (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 0 days.

(21) Appl. No.: 10/170,162

(22) Filed: Jun. 13, 2002

(51) Int. Cl.[7] .................................................. G06F 1/16
(52) U.S. Cl. ....................... 361/683; 361/686; 362/109; 235/486
(58) Field of Search ................... 361/683, 679–682, 361/684–687, 724–727; 362/109, 154, 156, 253; 235/486–487, 492; 312/223.1–223.6; 360/97.01

(56) References Cited

U.S. PATENT DOCUMENTS

| 6,447,140 B1 | * | 9/2002 | Lu | 362/109 |
| 6,522,534 B1 | * | 2/2003 | Wu | 361/686 |
| 2002/0122291 A1 | * | 9/2002 | Hubard | 361/683 |

* cited by examiner

*Primary Examiner*—Darren Schuberg
*Assistant Examiner*—Hung Van Duong
(74) *Attorney, Agent, or Firm*—Mark M. Friedman (57) ABSTRACT

A pocket-size computer peripheral system includes a computer peripheral device made up of at least two separable portions and an attachment bracket. The attachment bracket forms a sliding interconnection between the system and pocketable personal articles. Additionally, or alternatively, the attachment bracket selectively assumes one of two different attachment states with the separable portions of the device.

22 Claims, 11 Drawing Sheets

COMPUTER PERIPHERAL SYSTEM FOR INTERCONNECTION WITH POCKETABLE PERSONAL ARTICLES

FIELD AND BACKGROUND OF THE INVENTION

The present invention relates to computer peripheral devices and, in particular, it concerns a pocket-size computer peripheral system for interconnection with pocketable personal articles.

In the field of computers and computer peripheral devices, there is an ongoing trend towards miniaturization for convenience and portability. In certain cases, devices have been reduced to "pocket size", meaning that they can literally be carried in a user's pocket in the same manner as a wallet or set of keys.

One example of particular interest, in which context the present invention will be described herein, is a "flash disk". For example, a product known as "DiskOnKey"™, commercially available from M-Systems Ltd. (Israel), is a flash disk which can be connected to a USB port of a standard computer and is about the size of a pen. The USB connector is protected by a cover when not in use. The cover includes a key-ring loop, allowing the device to be interconnected with one or more pocketable personal article, for convenient transportation or storage in a user's pocket. Examples of "pocketable personal articles" with which users may wish to interconnect the device include, but are not limited to, a bunch of keys, a cellular telephone, a magnetic card or an ornament.

While the key-ring loop of the device is useful, it has been found that the fixed connection between the cover and a key-ring is limiting. For example, when used as a key-ring, the positioning of the ring at one end of the device may cause inconvenience or discomfort as it lies in a user's pocket. Furthermore, in certain cases, it would be preferable for a user to keep the main body of the device interconnected with his personal articles during use, while in other cases, complete disconnection or connection to only the cover portion may be preferred.

It would also be useful to provide a replaceable panel which could serve for color coding or otherwise distinguishing multiple similar devices so that a user can readily identify which of a plurality of devices he wishes to use.

SUMMARY OF THE INVENTION

The present invention is a pocket-size computer peripheral system for interconnection with pocketable personal articles.

According to the teachings of the present invention there is provided, a pocket-size computer peripheral system for interconnection with at least one pocketable personal article comprising: (a) a first computer peripheral device portion; (b) a second computer peripheral device portion removably engagable with the first computer peripheral device portion; and (c) an attachment bracket configured for interconnecting the system with the pocketable personal article, wherein the attachment bracket, the first portion and the second portion are configured such that, when the second portion is engaged with the first portion, the attachment bracket is slidably engaged with at least one track so as to be slidable along at least part of a length of the first portion.

According to a further feature of the present invention, the attachment bracket is engagable so as to be slidable along a majority of a length of the first portion.

According to a further feature of the present invention, the at least one track is implemented as a pair of ridges projecting from opposite sides of the first portion, and wherein the attachment bracket includes a pair of complementary projections configured to engage the ridges.

According to a further feature of the present invention, the first portion is formed with at least one slot bounded at least in part by one of the ridges, the system further comprising a replaceable panel element removably engagable within the slot such that at least part of the replaceable panel element is visibly exposed.

According to a further feature of the present invention, the first and second portions are configured such that, when the second portion is engaged with the first portion, the attachment bracket is retained on the at least one track and, when the second portion is removed from the first portion, the at least one track is open-ended to allow attachment or removal of the attachment bracket.

According to a further feature of the present invention, the second portion is configured to provide at least one supplementary track portion such that, when the second portion is engaged with the first portion, a part of the track extends along at least part of the second portion.

According to a further feature of the present invention, the attachment bracket, the first portion and the second portion are further configured such that the attachment bracket selectively assumes a second state non-slidingly engaged with one of the first portion and the second portion.

According to a further feature of the present invention, the second portion is formed with a flexible clip configured to receive the attachment bracket to define the second state.

According to a further feature of the present invention, the first portion is a housing containing electronic components of the computer peripheral system and wherein the second portion is a cover for selectively covering a part of the first portion.

According to a further feature of the present invention, the housing features a projecting connector, and wherein the cover selectively covers at least the projecting connector.

According to a further feature of the present invention, the system includes a flash-memory device.

There is also provided according to the teachings of the present invention, a pocket-size computer peripheral system for interconnection with at least one pocketable personal article comprising: (a) a first computer peripheral device portion; (b) a second computer peripheral device portion removably engagable with the first computer peripheral device portion; and (c) an attachment bracket configured for interconnecting the system with the pocketable personal article, wherein the attachment bracket, the first portion and the second portion are configured such that the attachment bracket selectively assumes a first engaged state defined at least in part by the first portion, and a second engaged state defined by the second portion.

According to a further feature of the present invention, the first portion is a housing containing electronic components of the computer peripheral system and wherein the second portion is a cover for selectively covering a part of the first portion.

According to a further feature of the present invention, the housing features a projecting connector, and wherein the cover selectively covers at least the projecting connector.

According to a further feature of the present invention, the attachment bracket, when in the first state, is slidably engaged with at least one track so as to be slidable along at least part of a length of the first portion.

According to a further feature of the present invention, the at least one track is implemented as a pair of ridges projecting from opposite sides of the first portion, and wherein the attachment bracket includes a pair of complementary projections configured to engage the ridges.

According to a further feature of the present invention, the first portion is formed with at least one slot bounded at least in part by one of the ridges, the system further comprising a replaceable panel element removably engagable within the slot such that at least part of the replaceable panel element is visibly exposed.

According to a further feature of the present invention, the first and second portions are configured such that, when the second portion is engaged with the first portion, the attachment bracket is retained on the at least one track and, when the second portion is removed from the first portion, the at least one track is open-ended to allow attachment or removal of the attachment bracket.

According to a further feature of the present invention, the second portion is configured to provide at least one supplementary track portion such that, when the second portion is engaged with the first portion, a part of the track extends along at least part of the second portion.

According to a further feature of the present invention, the second portion is formed with a flexible clip configured to receive the attachment bracket to define the second state.

Finally, there is also provided according to the teachings of the present invention, a pocket-size computer peripheral system comprising: (a) a first computer peripheral device portion formed with at least one slot bounded at least in part by a projecting ridge; (b) a replaceable panel element removably engagable within the slot such that at least part of the replaceable panel element is visibly exposed; and (c) a second computer peripheral device portion removably engagable with the first computer peripheral device portion.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a pocket-size computer peripheral system for interconnection with pocketable personal articles.

The principles and operation of systems according to the present invention may be better understood with reference to the drawings and the accompanying description.

Referring now to the drawings, FIGS. 1–11 show a pocket-size computer peripheral system, generally designated 10, constructed and operative according to the teachings of the present invention.

In general terms, system 10 has two portions which are removably engagable, and an attachment bracket for interconnecting the system with the pocketable personal article. The attachment bracket and first and second portions are configured such that, when the second portion is engaged with the first portion, the attachment bracket is slidably engaged with at least one track so as to be slidable along at least part of, and preferably along a majority of, a length of the first portion. Additionally, or alternatively, the attachment bracket and the first and second portions are configured such that the attachment bracket selectively assumes a first state engaged with at least the first portion, and a second state engaged with the second portion.

It will be immediately apparent that this configuration provides greatly improved flexibility with regard to interconnection of the device with pocketable personal articles. Firstly, in the slidable state, the point of interconnection between the device and the other articles is self-adjusting, rendering the interconnected items readily insertable in a smaller volume than would be possible with a fixed point of interconnection and avoiding the discomfort which could otherwise be caused by various positioning of the device within a user's pocket. Secondly, the system preferably offers additional flexibility by allowing easy removal of the attachment bracket when the portions of the device are disengaged and/or maintaining interconnection with either portion of the device, as will be described below. This provides the user with options of maintaining connection between the various items while the computer peripheral is in use, thereby keeping all of the items together, or of separating them, for example, when a set of keys are to be given temporarily to another person. Finally, in an additional preferred case, the attachment bracket may be non-slidingly attached to one of the portions of the device. This option is particularly useful for safeguarding of an inactive portion of the device (e.g., a cover) so that it is not mislaid while the other portion of the device is in use. This and other advantages of the present invention will become clearer from the following description.

It should be appreciated that the present invention is applicable to all and any computer peripheral devices which are readily transportable and which may be advantageously interconnected with various personal articles. Examples include, but are not limited to, memory and other data storage devices, communications devices, scanners and cameras. Furthermore, the term "computer peripheral" is used herein to refer to any device for use in combination with an electronic computer of any type or size including, but not limited to, desktop computers (PC, Mac or other), notebook computers, palmtop computers and PDAs. The device may be connected to the computer by direct electrical connection, or by a wireless link such as an IR link or "bluetooth". By way of a non-limiting example, the present invention will be illustrated herein with reference to a flash-memory device for attachment to a universal serial bus (USB).

Turning now to the implementation illustrated here, system 10 includes a computer peripheral device 12 having a housing 14 and a projecting connector 16. A cover 18 is removably engagable with computer peripheral device 12 so as to selectively cover at least projecting connector 16. An attachment bracket 20 is configured for suspending the system from a key chain (not shown), for example, via a key ring 22. It is a particular feature of certain preferred implementations of the present invention that attachment bracket 20, housing 14 and cover 18 are configured such that attachment bracket 20 selectively assumes a non-slidable hinged state (FIGS. 1–4) engaged with cover 18, and a slidable state (FIGS. 5 and 6) defined at least in part by engagement with housing 14. It is a further particular feature of certain preferred implementations of the present invention that attachment bracket 20 is slidably engagable with at least one track formed on housing 14 so as to be slidable along at least part, and preferably a majority, of a length of housing 14.

Figure 5:
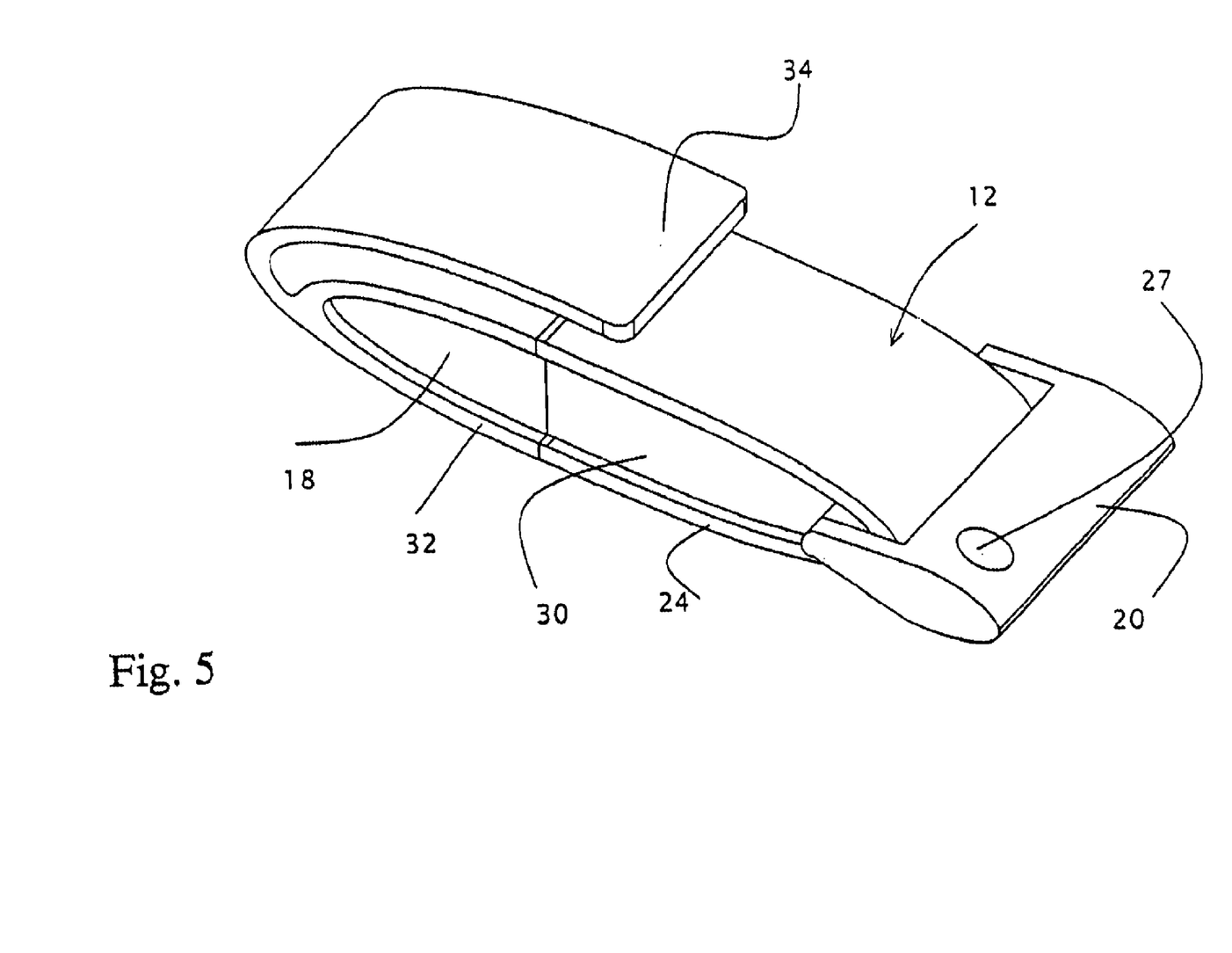
FIG. 5 is an isometric view of the computer peripheral system of FIG. 1 with an attachment bracket shown in a slidable state.
Figure 6:
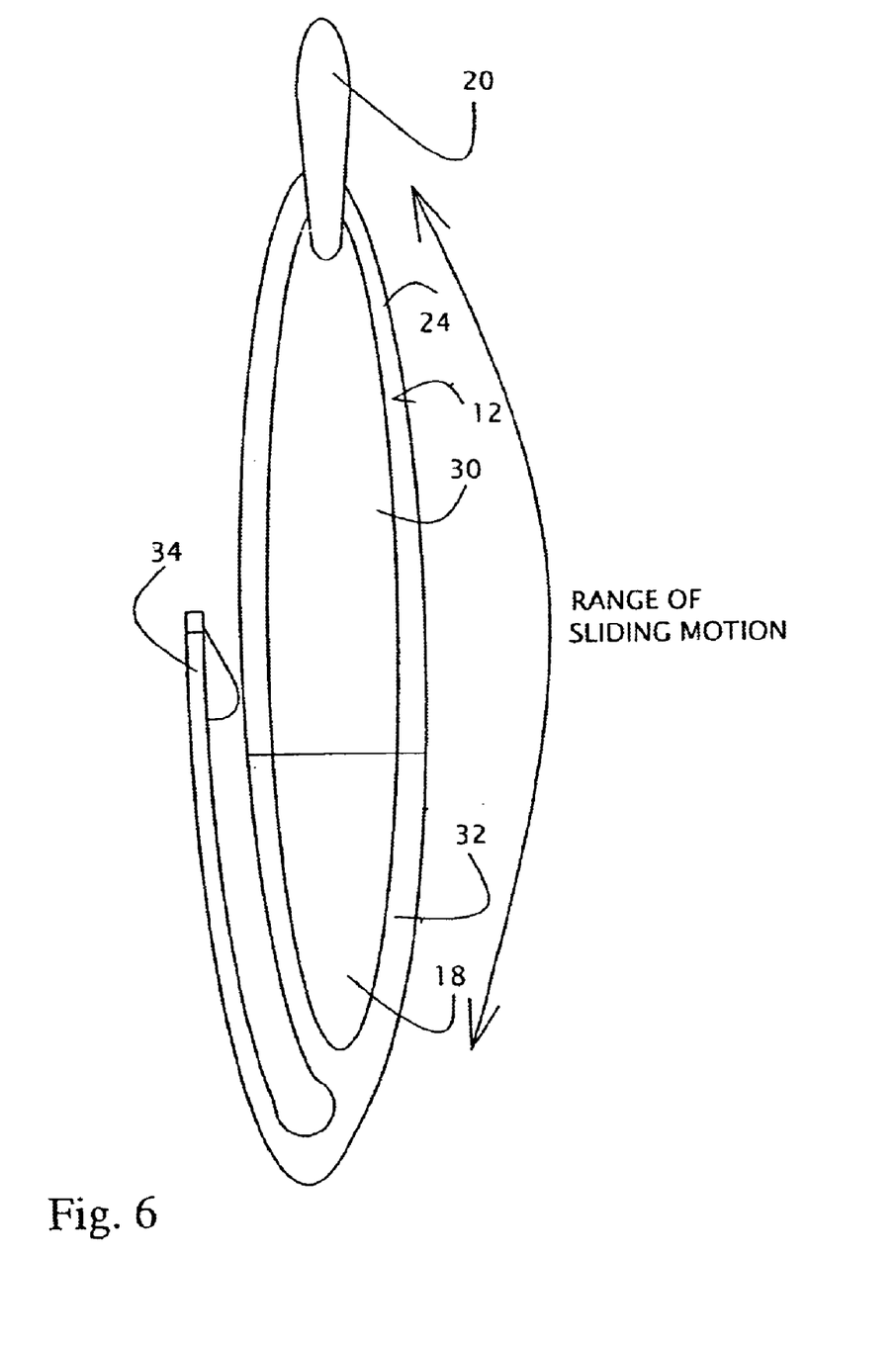
FIG. 6 is a side view of the computer peripheral system in the state of FIG. 5.
Figure 7:
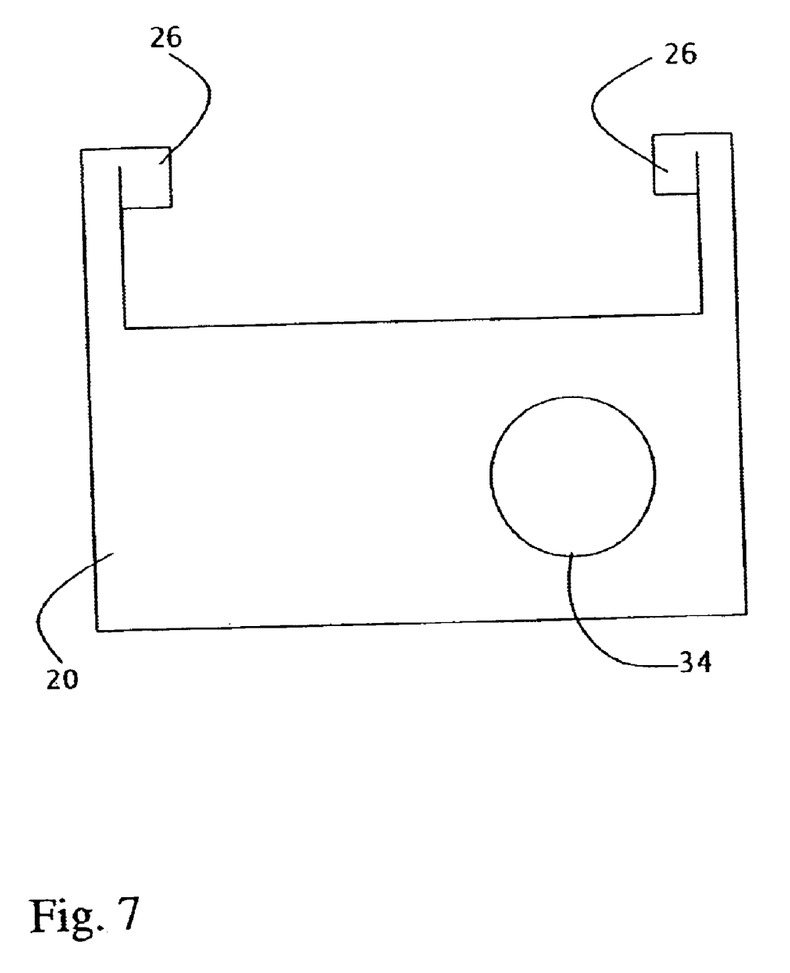
FIG. 7 is a plan view of the attachment bracket from the computer peripheral system of FIG. 1.
Figure 8:
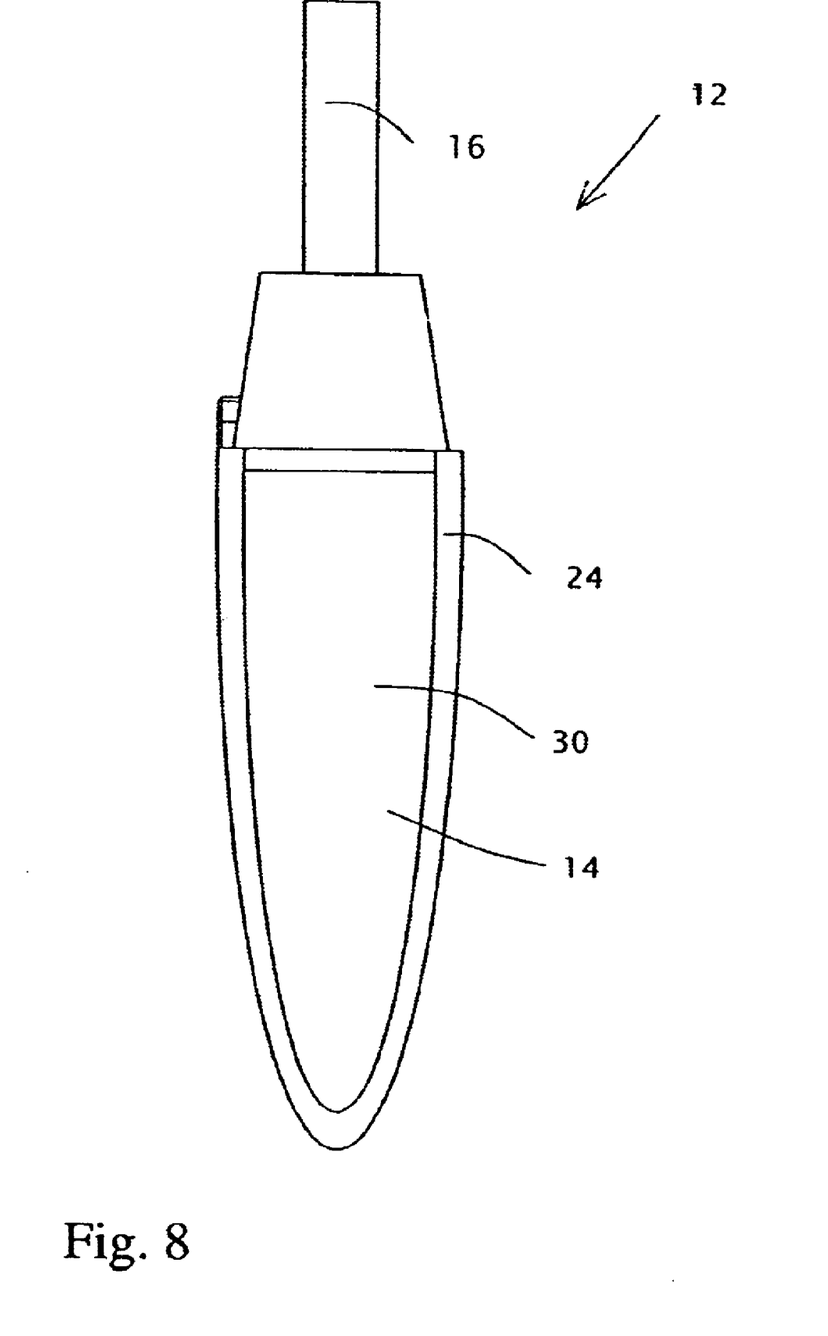
FIG. 8 is a side view of the computer peripheral system of FIG. 1 with a cover removed.
Figure 9:
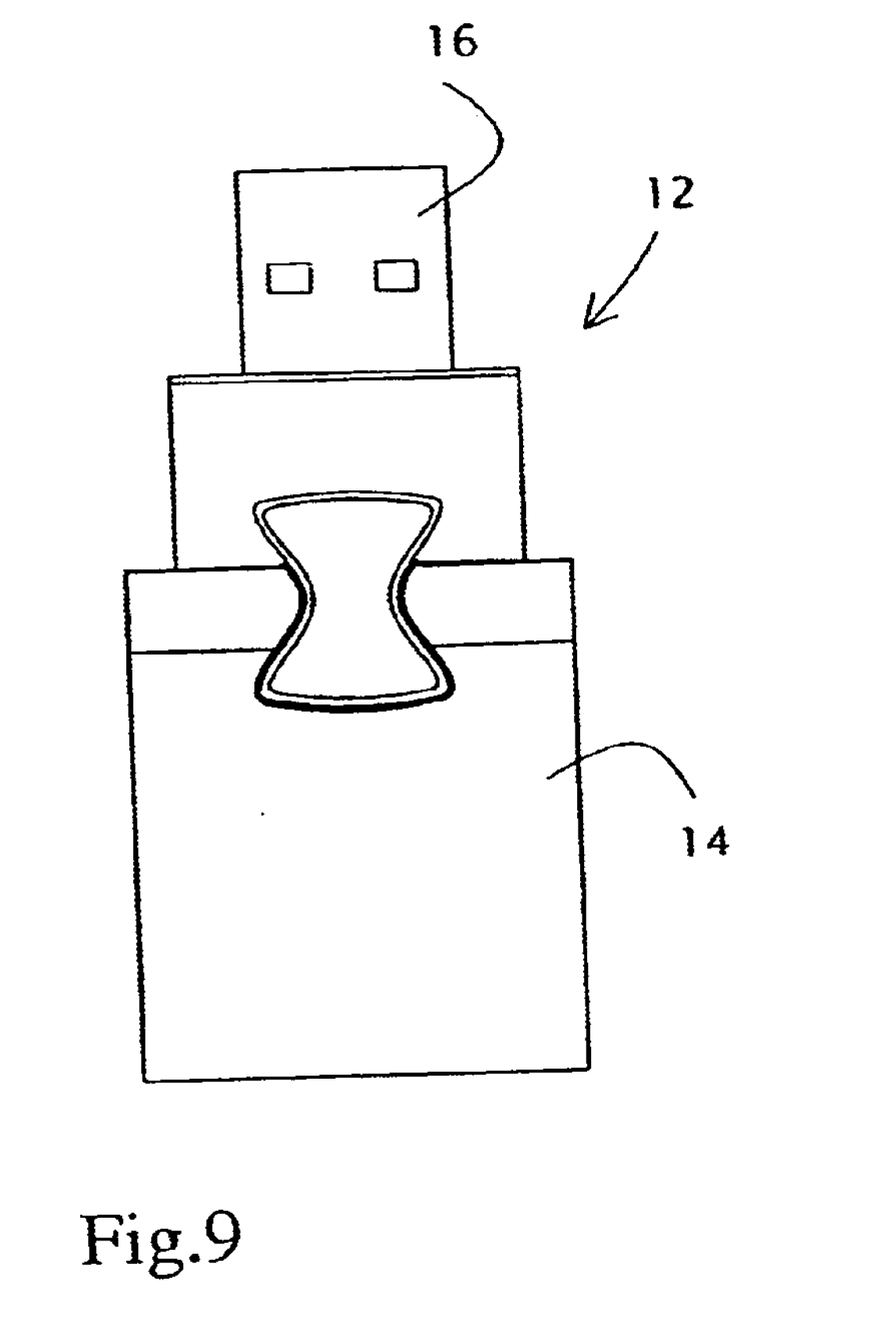
FIG. 9 is a rear view of the system of FIG. 8.

Turning now to the features of the present invention in more detail, when in the state of FIGS. 5–6, attachment bracket 20 is here slidably engaged with at least one track so as to be slidable along at least part of a length of housing 14. The "length" referred to here is preferably the longest dimension of the computer peripheral device. Preferably, the track is implemented as a pair of ridges 24 projecting from opposite sides of the housing. In this case, attachment bracket 20 preferably features a pair of complementary projections 26 configured to engage ridges 24. Attachment bracket 20 also preferably features an aperture 27 for receiving key-ring 22.

Most preferably, ridges 24 may be edges of a wall spanning substantially the entire width of housing 14, thereby rendering the structure particularly simple to produce. The various elements of the device illustrated here may be made of any suitable materials. Preferred examples include, but are not limited to, polymer materials and metallic alloys.

Figure 10:
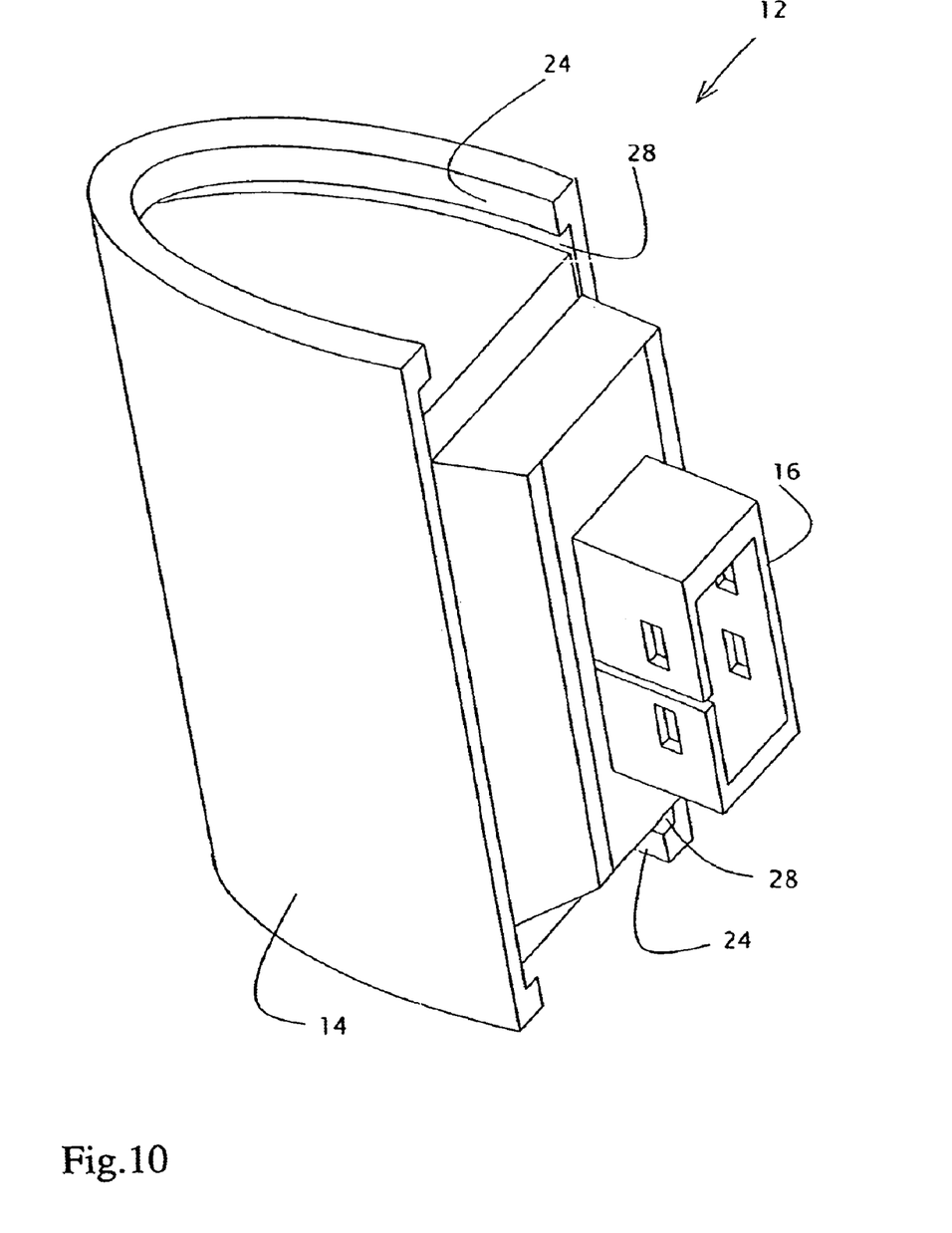
FIG. 10 is an isometric view of the system of FIG. 8 taken from the connector end.
Figure 11:
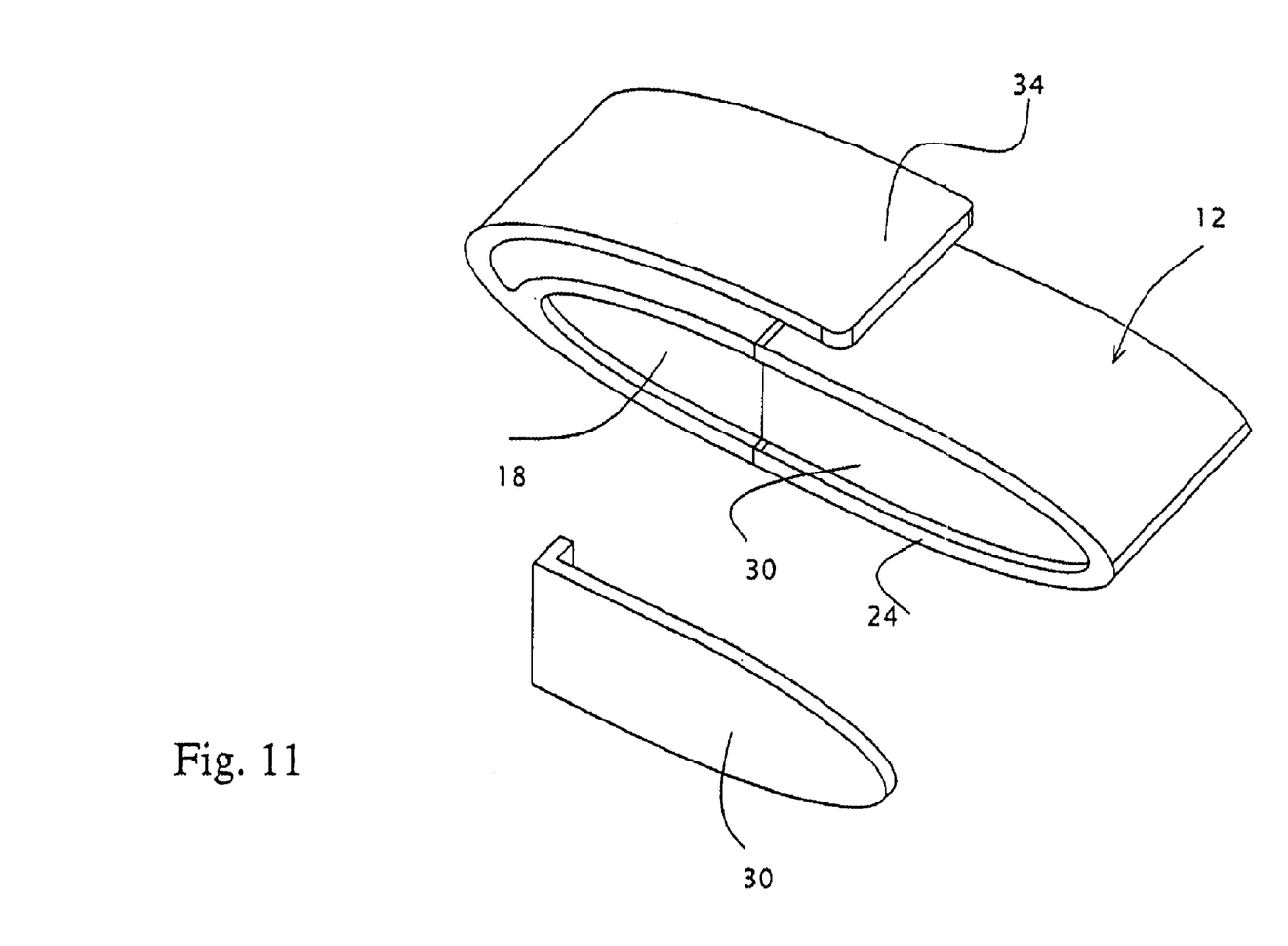
FIG. 11 is an isometric view of part of the system of FIG. 1 showing a replaceable panel prior to attachment to the system.

Referring briefly to FIGS. 10 and 11, according to a further particularly preferred aspect of the present invention, housing 14 is formed with at least one slot 28 (best seen in FIG. 10), preferably bounded at least in part by one of ridges 24. Slot 28 is preferably configured to receive a replaceable panel element 30 (shown with one separate and one attached in FIG. 11) so that at least part of the replaceable panel element is visibly exposed, as seen for example in FIG. 1. Panel elements 30 may be colored or otherwise visually distinguishable to enable a user to readily identify a desired device from a plurality of otherwise similar devices. Alternatively, or additionally, panel element 30 may include or support a printable surface for hand inscription or other labeling to facilitate identification of the content or intended use of the device.

It is a further preferred feature of the system of the present invention that, when cover 18 is in place engaged with device 12, cover 18 cooperates with the track of housing 14 to retain attachment bracket 20 on the track while, when cover 18 is removed from device 12, the track is open-ended to allow attachment or removal of attachment bracket 20. The retention of bracket 20 may be achieved by forming the track as a closed loop track, or as a closed-ended track, or by any other suitable mechanical arrangement. It should be noted in this context that the terms "closed-ended" and "open-ended" are defined herein by the retention or lack thereof, respectively, of the bracket at the end of its motion along the track, and are not limited to any specific structural implementation. In the preferred implementation shown here, cover 18 has additional projecting ridges 32 which provide a supplementary track portion such that, when cover 18 is engaged with device 12, a part of the track extends along at least part of cover 18.

Figure 1:
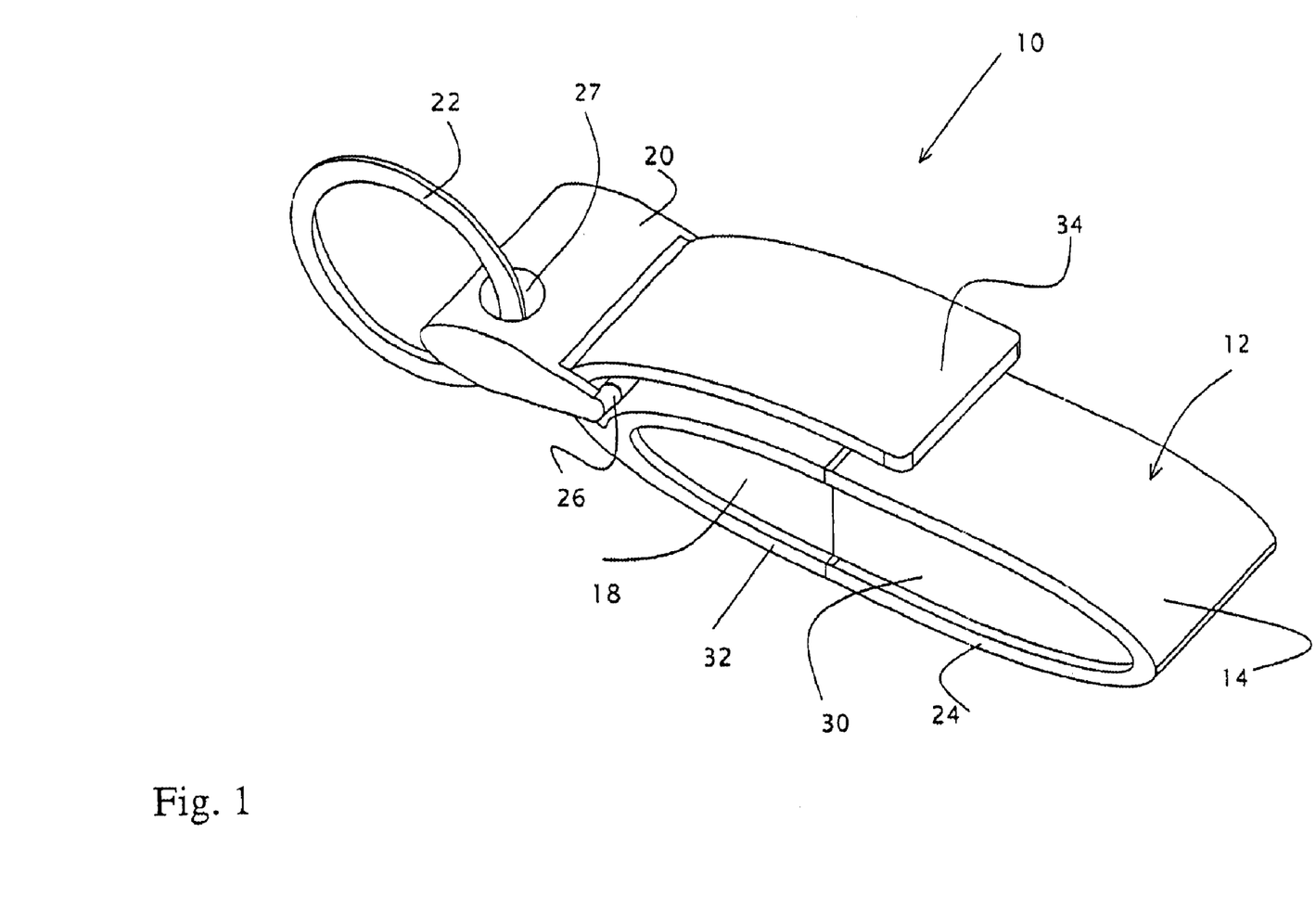
FIG. 1 is a isometric view of a computer peripheral system, constructed and operative according to the teachings of the present invention, with an attachment bracket shown in a non-sliding hinged state.
Figure 2:
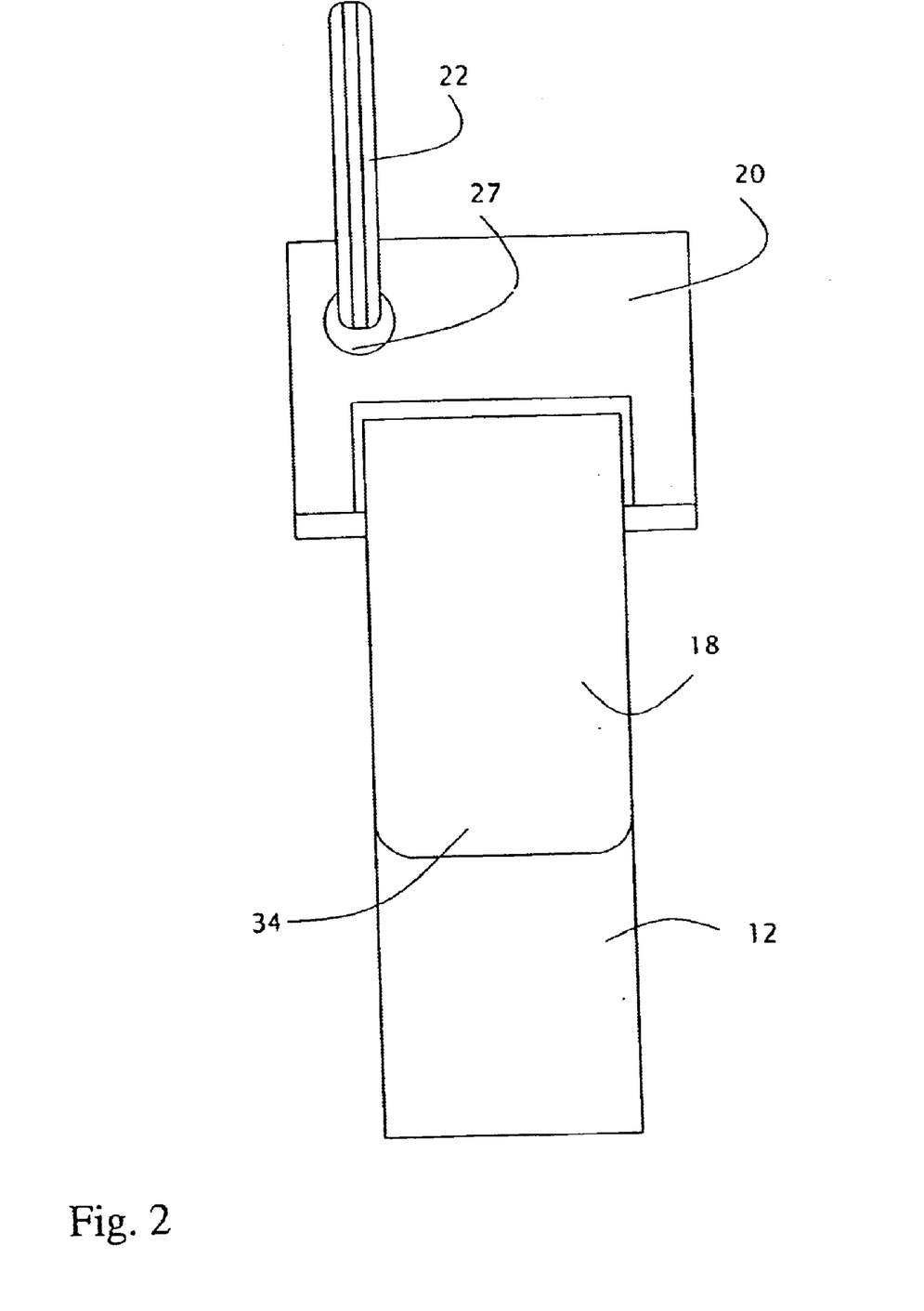
FIG. 2 is a front view of the computer peripheral system in the state of FIG. 1.
Figure 3:
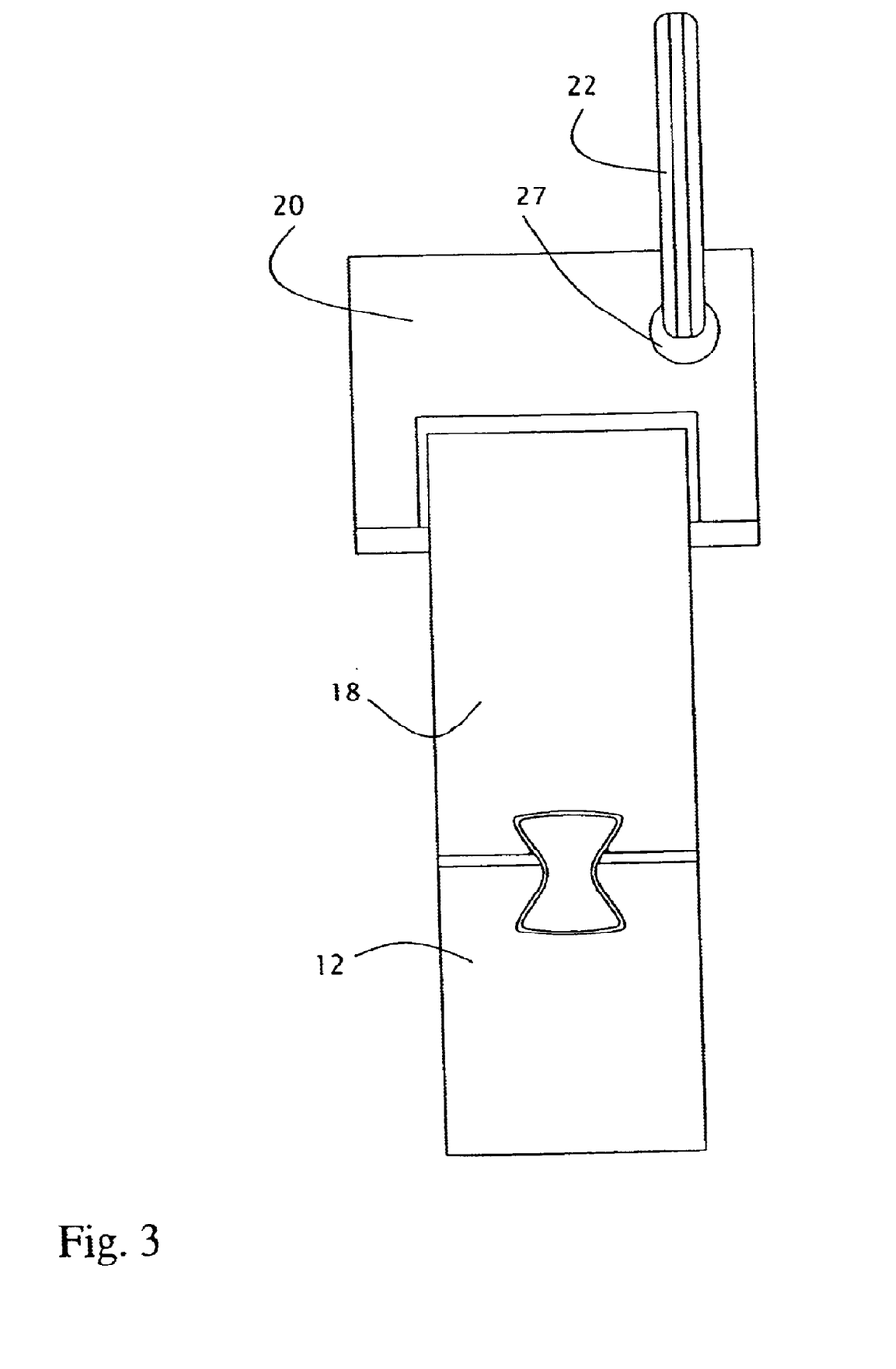
FIG. 3 is a rear view of the computer peripheral system in the state of FIG. 1.
Figure 4:
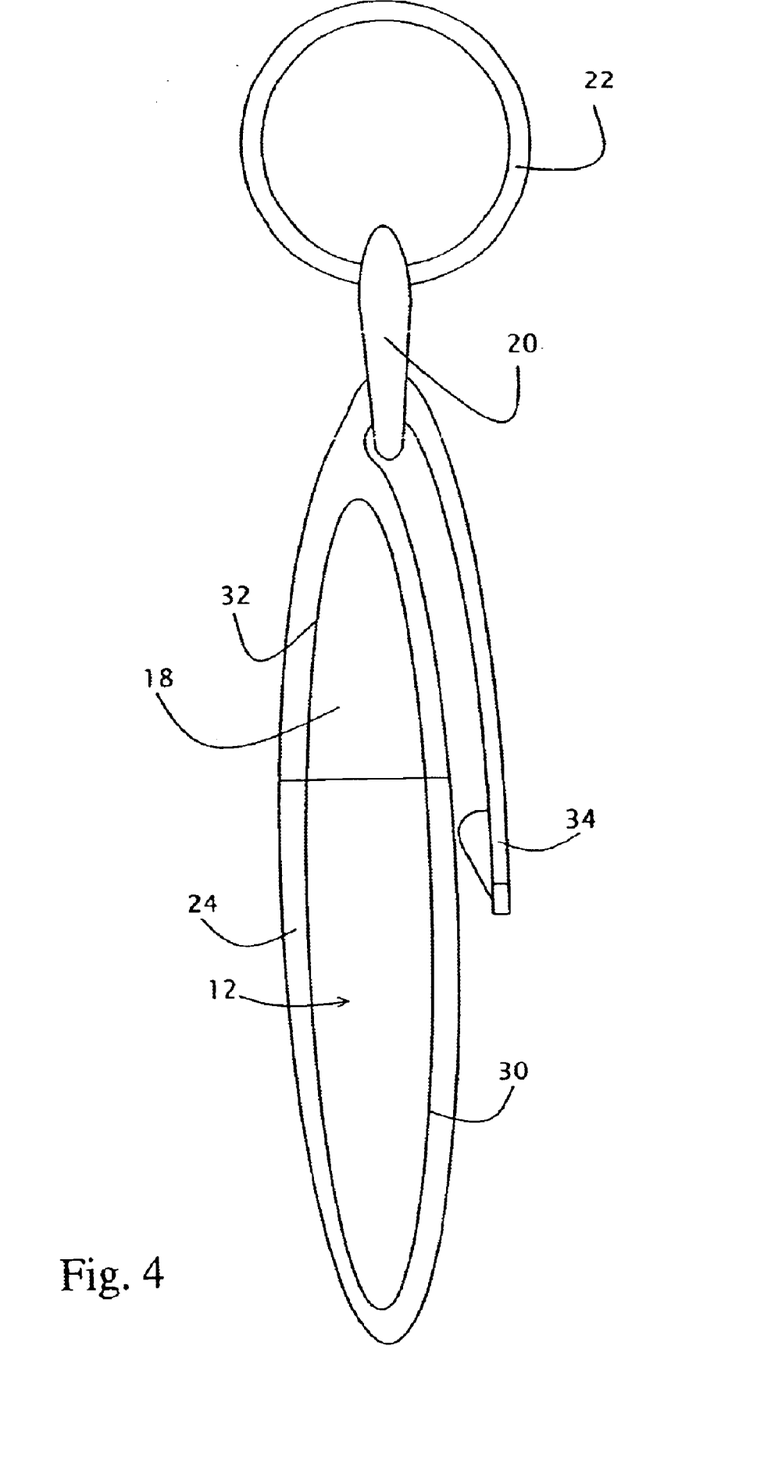
FIG. 4 is a side view of the computer peripheral system in the state of FIG. 1.

Turning now to the first state of FIGS. 1–4, cover 18 is preferably formed with a flexible clip 34 configured to receive attachment bracket 20 to define the first state as shown. In the preferred implementation shown here, clip 34 is a broad flexible clip integrally formed with cover 18 and defines a transverse channel region near its connection to the main portion of the cover. In use, projections 26 are positioned under the end of clip 34 and slide along under the clip until they click into position in the transverse channel region as shown in FIGS. 1 and 4.

As mentioned earlier, the present invention is applicable to a wide range of devices and applications. Most preferably, the invention is implemented with a flash-memory device or "flash disk".

Finally, it should be noted that the various different aspects of the present invention may be used separately to advantage. For example, a computer peripheral system may use to advantage the replaceable panel element feature of the present invention independent of the features relating to the attachment bracket.

It will be appreciated that the above descriptions are intended only to serve as examples, and that many other embodiments are possible within the spirit and the scope of the present invention.

What is claimed is:

1. A pocket-size computer peripheral system for interconnection with at least one pocketable personal article comprising:
   (a) a first computer peripheral device portion;
   (b) a second computer peripheral device portion removably engagable with said first computer peripheral device portion; and
   (c) an attachment bracket configured for interconnecting the system with the pocketable personal article,
wherein said attachment bracket, said first portion and said second portion are configured such that, when said second portion is engaged with said first portion, said attachment bracket is slidably engaged with at least one track so as to be slidable along at least part of a length of said first portion.

2. The system of claim 1, wherein said attachment bracket is engagable so as to be slidable along a majority of a length of said first portion.

3. The system of claim 1, wherein said at least one track is implemented as a pair of ridges projecting from opposite sides of said first portion, and wherein said attachment bracket includes a pair of complementary projections configured to engage said ridges.

4. The system of claim 1, wherein said first and second portions are configured such that, when said second portion is engaged with said first portion, said attachment bracket is retained on said at least one track and, when said second portion is removed from said first portion, said at least one track is open-ended to allow attachment or removal of said attachment bracket.

5. The system of claim 1, wherein said attachment bracket, said first portion and said second portion are further configured such that said attachment bracket selectively assumes a second state non-slidingly engaged with one of said first portion and said second portion.

6. The system of claim 1, wherein said first portion is a housing containing electronic components of the computer peripheral system and wherein said second portion is a cover for selectively covering a part of said first portion.

7. The system of claim 1, wherein said system includes a flash-memory device.

8. The system of claim 3, wherein said first portion is formed with at least one slot bounded at least in part by one of said ridges, the system further comprising a replaceable panel element removably engagable within said slot such that at least part of said replaceable panel element is visibly exposed.

9. The system of claim 4, wherein said second portion is configured to provide at least one supplementary track portion such that, when said second portion is engaged with said first portion, a part of said track extends along at least part of said second portion.

10. The system of claim 5, wherein said second portion is formed with a flexible clip configured to receive said attachment bracket to define said second state.

11. The system of claim 10, wherein said housing features a projecting connector, and wherein said cover selectively covers at least said projecting connector.

12. A pocket-size computer peripheral system for interconnection with at least one pocketable personal article comprising:
   (a) a first computer peripheral device portion;
   (b) a second computer peripheral device portion removably engagable with said first computer peripheral device portion; and
   (c) an attachment bracket configured for interconnecting the system with the pocketable personal article, wherein said attachment bracket, said first portion and said second portion are configured such that said attachment bracket selectively assumes a first engaged state defined at least in part by said first portion, and a second engaged state defined by said second portion.

13. The system of claim 12, wherein said first portion is a housing containing electronic components of the computer peripheral system and wherein said second portion is a cover for selectively covering a part of said first portion.

14. The system of claim 12, wherein said attachment bracket, when in said first state, is slidably engaged with at least one track so as to be slidable along at least part of a length of said first portion.

15. The system of claim 12, wherein said second portion is formed with a flexible clip configured to receive said attachment bracket to define said second state.

16. The system of claim 12, wherein said system includes a flash-memory device.

17. The system of claim 13, wherein said housing features a projecting connector, and wherein said cover selectively covers at least said projecting connector.

18. The system of claim 14, wherein said at least one track is implemented as a pair of ridges projecting from opposite sides of said first portion, and wherein said attachment bracket includes a pair of complementary projections configured to engage said ridges.

19. The system of claim 14, wherein said first and second portions are configured such that, when said second portion is engaged with said first portion, said attachment bracket is retained on said at least one track and, when said second portion is removed from said first portion, said at least one track is open-ended to allow attachment or removal of said attachment bracket.

20. The system of claim 18, wherein said first portion is formed with at least one slot bounded at least in part by one of said ridges, the system further comprising a replaceable panel element removably engagable within said slot such that at least part of said replaceable panel element is visibly exposed.

21. The system of claim 19, wherein said second portion is configured to provide at least one supplementary track portion such that, when said second portion is engaged with said first portion, a part of said track extends along at least part of said second portion.

22. A pocket-size computer peripheral system comprising:
   (a) a first computer peripheral device portion formed with at least one slot bounded at least in part by a projecting ridge;
   (b) a replaceable panel element removably engagable within said slot such that at least part of said replaceable panel element is visibly exposed; and
   (c) a second computer peripheral device portion removably engagable with said first computer peripheral device portion.

* * * * *